United States Patent
Ananthanarayanan et al.

(10) Patent No.: US 7,423,232 B2
(45) Date of Patent: Sep. 9, 2008

(54) METHOD FOR RESISTANCE WELDING/BRAZING A TUBE TO A MEMBER

(75) Inventors: Venkatasubramanian Ananthanarayanan, Beavercreek, OH (US); Dharmendra M. Ramachandra, Centerville, OH (US); Richard W. Marczewski, Dryden, MI (US)

(73) Assignee: Delphi Technologies, Inc., Troy, MI (US)

( * ) Notice: Subject to any disclaimer, the term of this patent is extended or adjusted under 35 U.S.C. 154(b) by 457 days.

(21) Appl. No.: 11/109,570

(22) Filed: Apr. 19, 2005

(65) Prior Publication Data

US 2005/0194360 A1    Sep. 8, 2005

Related U.S. Application Data

(63) Continuation-in-part of application No. 10/430,578, filed on May 6, 2003, now abandoned.

(51) Int. Cl.
*B23K 9/00* (2006.01)
*B23K 11/00* (2006.01)
*B23K 1/00* (2006.01)
*B23K 35/12* (2006.01)

(52) U.S. Cl. .............. 219/59.1; 219/85.22; 228/245

(58) Field of Classification Search .......... 219/117.1, 219/59.1, 85.22; 228/245
See application file for complete search history.

(56) References Cited

U.S. PATENT DOCUMENTS

| | | | |
|---|---|---|---|
| 1,292,812 A | 1/1919 | Lachman | |
| 2,106,272 A | 1/1938 | Elsey | |
| 2,277,871 A | 3/1942 | Mitchell et al | |
| 2,326,296 A | 8/1943 | Harrison | |
| 2,447,259 A | 8/1948 | Lucke | |
| 2,824,212 A | 2/1958 | Roberts | |
| 3,503,474 A | 3/1970 | Raab | |
| 3,585,345 A | 6/1971 | Jepersen | |
| 3,618,817 A | 11/1971 | Troughton | |
| 3,784,260 A | 1/1974 | Araya | |
| 3,784,778 A | 1/1974 | McPherson et al. | |
| 4,185,369 A | 1/1980 | Darrow et al. | |
| 4,231,488 A | 11/1980 | Ward et al. | |
| 4,269,106 A | 5/1981 | Leibhard et al. | |
| 4,273,983 A | 6/1981 | Ogawa et al. | |
| 4,322,598 A | 3/1982 | Blair | |
| 4,408,112 A | 10/1983 | Kazlauskas | |

(Continued)

FOREIGN PATENT DOCUMENTS

DE    2806287    8/1979

(Continued)

*Primary Examiner*—Jerry Lorengo
*Assistant Examiner*—Megha Mehta
(74) *Attorney, Agent, or Firm*—Scott A. McBain

(57) ABSTRACT

A method for welding/brazing a tube to a member. The tube has an axially-extending first portion and has a tube form which extends transversely from the first portion. A filler material is obtained. The tube, the member and the filler material are positioned such that the filler material contacts the tube form and the member. A resistance current path is created through the tube, the filler material and the member which melts at least some of the filler material creating a weld/braze zone which includes at least some of the tube, at least some of the member, and at least some of the filler material.

20 Claims, 2 Drawing Sheets

U.S. PATENT DOCUMENTS

| | | | |
|---|---|---|---|
| 4,427,869 A | 1/1984 | Kimura et al. |
| 4,480,166 A | 10/1984 | Leech |
| 4,496,410 A | 1/1985 | Davis et al. |
| 4,514,614 A | 4/1985 | Stol |
| 4,648,811 A | 3/1987 | Tahata et al. |
| 4,676,427 A | 6/1987 | Constance |
| 4,677,271 A | 6/1987 | Opprecht |
| 4,769,624 A | 9/1988 | Merritt et al. |
| 5,204,491 A | 4/1993 | Aureal et al. |
| 5,374,800 A | 12/1994 | Yoneda |
| 5,386,923 A | 2/1995 | Nakashima et al. |
| 5,538,076 A | 7/1996 | Nishida et al. |
| 5,540,192 A | 7/1996 | Xanders |
| 5,649,039 A | 7/1997 | Benzoni et al. |
| 5,786,548 A | 7/1998 | Fanucchi et al. |
| 5,831,235 A | 11/1998 | Cecil |
| 5,896,960 A | 4/1999 | Ananthanarayanan |
| 6,089,617 A | 7/2000 | Craig et al. |
| 6,130,502 A | 10/2000 | Kobayashi et al. |
| 6,186,696 B1 | 2/2001 | Valin |
| 6,287,513 B1 | 9/2001 | Grady et al. |
| 6,370,740 B1 | 4/2002 | Foreman |
| 6,390,124 B1 | 5/2002 | Kido et al. |
| 6,476,543 B1 | 11/2002 | Mera et al. |
| 6,539,837 B2 | 4/2003 | Fanelli et al. |
| 6,552,294 B1 | 4/2003 | Ananthanarayanan et al. |
| 6,586,110 B1 | 7/2003 | Obeshaw |
| 6,615,488 B2 | 9/2003 | Anders et al. |
| 6,623,048 B2 | 9/2003 | Castel et al. |
| 6,654,995 B1 | 12/2003 | Wang et al. |
| 6,689,981 B1 | 2/2004 | Ananthanarayanan et al. |
| 6,693,251 B1 | 2/2004 | Ananthanarayanan et al. |
| 6,705,438 B2 | 3/2004 | Ananthanarayanan et al. |
| 6,717,091 B2 | 4/2004 | Ananthanarayanan et al. |
| 6,791,051 B2 | 9/2004 | Ananthanarayanan et al. |
| 6,791,052 B1 | 9/2004 | Ananthanarayanan et al. |
| 2002/0008387 A1 | 1/2002 | Vasudeva |
| 2002/0162651 A1 | 11/2002 | Nakagome et al. |
| 2003/0196715 A1 | 10/2003 | Sakamoto et al. |
| 2004/0035504 A1 | 2/2004 | Ananthanarayanan et al. |
| 2004/0035829 A1 | 2/2004 | Ananthanarayanan et al. |
| 2004/0035830 A1 | 2/2004 | Ananthanarayanan et al. |
| 2004/0035832 A1 | 2/2004 | Ananthanarayanan et al. |
| 2004/0035833 A1 | 2/2004 | Ananthanarayanan et al. |
| 2004/0035834 A1 | 2/2004 | Ananthanarayanan et al. |
| 2004/0056001 A1 | 3/2004 | Ananthanarayanan et al. |

FOREIGN PATENT DOCUMENTS

| | | |
|---|---|---|
| DE | 4209218 | 11/1993 |
| EP | 0884501 | 12/1998 |
| JP | 55-136584 | 10/1980 |
| JP | 55-136593 | 10/1980 |
| JP | 08193577 | 7/1996 |
| JP | 08215859 A | 8/1996 |
| WO | WO 2004/019377 | 3/2004 |
| WO | WO 2004/028730 | 4/2004 |

METHOD FOR RESISTANCE WELDING/BRAZING A TUBE TO A MEMBER

CROSS-REFERENCE TO RELATED APPLICATIONS

The present application is a continuation-in-part application of U.S. patent application Ser. No. 10/430,578 filed May 6, 2003 now abandoned.

TECHNICAL FIELD

The present invention relates generally to welding and brazing, and more particularly to a method for resistance welding/brazing a tube to a member.

BACKGROUND OF THE INVENTION

Resistance welding (also known as electric-resistance welding) is a known metallurgical process used to weld a right-angle end flange of a tube to a surface projection of a plate wherein metal is heated by its own resistance to a semi-fused (i.e., soft) or fused (i.e., molten) state by the passage of very heavy electric currents for very short lengths of time and then welded. In one known variation, the plate is stamped creating depressions on the top surface and creating surface projections on the bottom surface so that during the resistance welding, the projections soften and/or melt creating a weld nugget which joins together the plate to the tube flange.

Conventional methods for welding a tube to another tube or for welding a tube to a plate include gas metal arc welding. Gas metal arc welding uses a consumable metal wire as one electrode and the parts as another electrode, and moves the consumable metal wire (or the parts) to draw an arc and weld the parts together. The welding is accompanied by a gas (such as a mixture of argon and carbon dioxide) to prevent oxidation and stabilize the arc. Such gas metal arc welding is well known. In a conventional gas metal arc welding technique, solid metal wire or metal core wire (i.e., an annular-solid wire whose core is filled with metal powder such as a mixture of metal, alloy and/or oxide powders) is used with the wire usually at a positive electrical welding potential and with the parts electrically grounded. The welding arc creates a molten weld puddle which results in the welding together of the parts. A ceramic ferrule is used to contain the weld puddle when needed. Gas metal arc welding requires expensive welding equipment, the molten weld puddle tends to flow away from the joint area (depending on the joint position with respect to gravity) resulting in welds of inconsistent quality, and the process requires a long cycle time between welds.

Conventional methods for attaching parts together also include friction welding. To join two tubes together end to end, one of the tubes is rotated about its longitudinal axis, and the tube ends are pressed together, wherein friction causes heating of the ends creating the weld. To join a tube to a plate, the tube is rotated about its longitudinal axis, and the tube end and the plate are pressed together, wherein friction causes heating creating the weld. Friction welding requires expensive welding equipment, and the process requires a long cycle time between welds. Friction welding is not easily applicable to thin-walled tubes because they do not retain their shapes well under heat and pressure. It is noted that laser and electron-beam welding for the above joints also need expensive equipment and expensive joint preparation.

Conventional brazing is a known metallurgical process used to join together two metal members. In this method, a brazing material is interposed between the two members, and external heat is applied to the assemblage which bonds the brazing material to the two members. Typically, a batch of assemblages of member pairs with interposed brazing material is heated in an oven or by an infrared heat source. In some applications, the members tend to become distorted from the oven or infrared heat. Conventional brazing requires expensive heating equipment and batch heat processing of the assemblages.

What is needed is a less expensive method for metallurgically joining a tube to a member.

SUMMARY OF THE INVENTION

A first method of the invention is for welding/brazing a tube to a member and includes steps a) through e). Step a) includes obtaining a tube having an axially-extending first portion and having a tube form which extends transversely from the first portion. Step b) includes obtaining a member. Step c) includes obtaining a filler material having a different chemical composition from that of the tube and the member. Step d) includes, after steps a) through c), positioning the tube, the member and the filler material such that the filler material contacts the tube form and the member. Step e) includes, after step d), creating a resistance current path through the tube, the filler material and the member which melts at least some of the filler material creating a weld/braze zone which includes at least some of the tube, at least some of the member, and at least some of the filler material.

A second method of the invention is for welding a tube to a member and includes steps a) through e) Step a) includes obtaining a tube having an axially-extending first portion and having a tube form which extends transversely from the first portion. Step b) includes obtaining a member. Step c) includes obtaining a filler material. Step d) includes, after steps a) through c), positioning the tube, the member and the filler material such that the filler material contacts the tube form and the member. Step e) includes, after step d), creating a resistance current path through the tube, the filler material and the member which melts at least some of the filler material creating a weld zone which includes at least some of the tube, at least some of the member, and at least some of the filler material.

A third method of the invention is for brazing a tube to a member and includes steps a) through e) Step a) includes obtaining a tube having an axially-extending first portion and having a tube form which extends transversely from the first portion. Step b) includes obtaining a member. Step c) includes obtaining a filler material having a different chemical composition from that of the tube and the member. Step d) includes, after steps a) through c), positioning the tube, the member and the filler material such that the filler material contacts the tube form and the member. Step e) includes, after step d), creating a resistance current path through the tube, the filler material and the member which melts at least some of the filler material creating a braze zone which includes at least some of the tube, at least some of the member, and at least some of the filler material.

Several benefits and advantages are derived from one or more of the methods of the invention. The tube form allows resistance welding/brazing of a tube to a member to be commercially feasible, as can be appreciated by those skilled in the art. Resistance welding/brazing is less expensive than gas metal arc welding or friction welding or brazing using an external heat source. Resistance welding/brazing also has a shorter cycle time between welds/brazes than gas metal arc welding or friction welding or brazing using an external heat source. Resistance welding/brazing heats only the joint area of the tube and the member avoiding heat distortion of the parts in contrast to using an external heat source.

DESCRIPTION OF THE PREFERRED EMBODIMENTS

Figure 1:
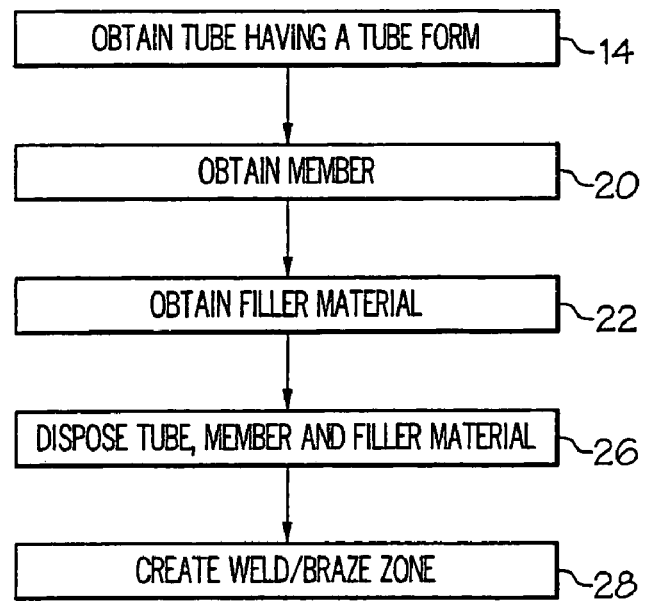
FIG. 1 is a block diagram of a first method of the invention for resistance welding/brazing a tube to a member.
Figure 2:
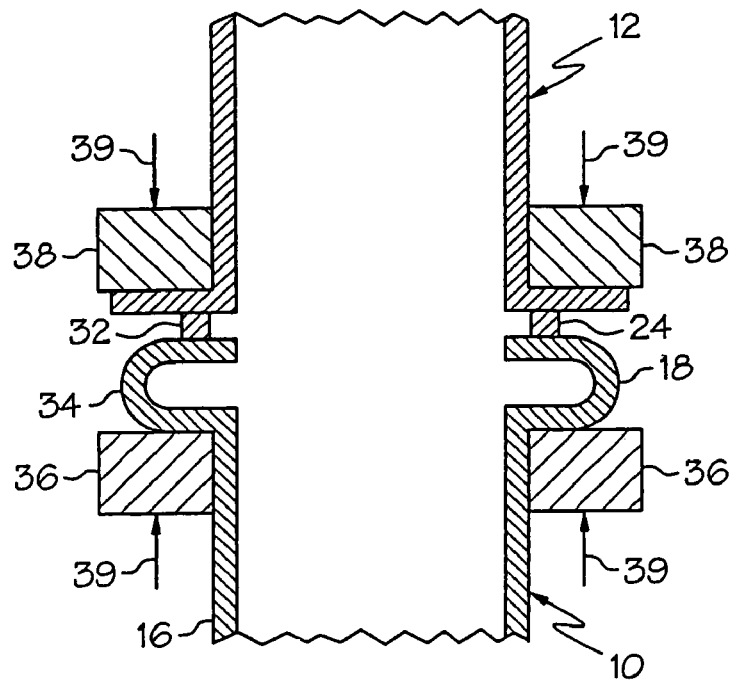
FIG. 2 is a schematic, side cross-sectional view of a first embodiment of a tube and a member (which is another tube) and a filler material gasket used in a first example of the first method, showing the tubes just before welding/brazing.
Figure 3:
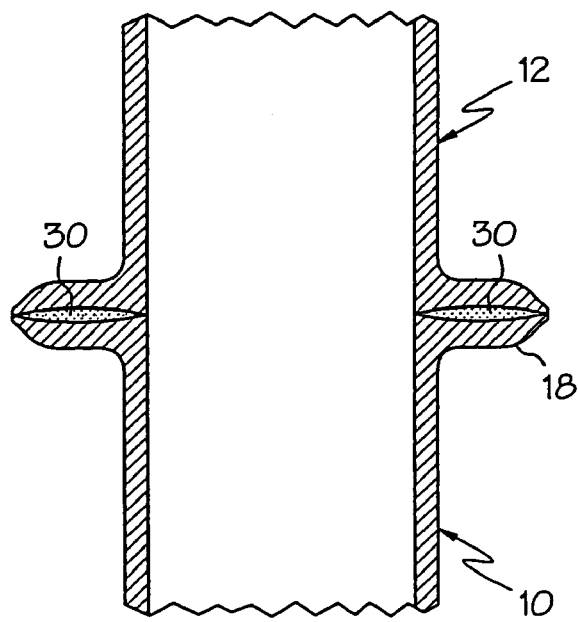
FIG. 3 is a view, as in FIG. 2, but showing the two tubes after welding/brazing and with the welding/brazing electrodes removed.

A first method of the invention is for welding/brazing a tube 10 to a member 12 and is shown in block diagram form in FIG. 1 with a first embodiment of the tube 10 and the member 12 shown in FIGS. 2 and 3. The first method includes steps a) through e). Step a) is labeled as "Obtain Tube Having A Tube Form" in block 14 of FIG. 1. Step a) includes obtaining a tube 10 having an axially-extending first portion 16 and having a tube form 18 which extends transversely from the first portion 16. Step b) is labeled as "Obtain Member" in block 20 of FIG. 1. Step b) includes obtaining a member 12. Step c) is labeled as "Obtain Filler Material" in block 22 of FIG. 1. Step c) includes obtaining a filler material 24. Step d) is labeled as "Dispose Tube, Member and Filler Material" in block 26 of FIG. 1. Step d) includes, after steps a) through c), disposing the tube 10, the member 12, and the filler material 24 such that the filler material 24 contacts the tube form 18 and the member 12. Step e) is labeled as "Create Weld/Braze Zone" in block 28 of FIG. 1. Step e) includes, after step d), creating a resistance current path through the tube 10, the filler material 24 and the member 12 which melts at least some of the filler material 24 creating a weld/braze zone 30 which includes at least some of the tube 10, at least some of the filler material 24 and at least some of the member 12.

By "welding/brazing" a tube 10 to a member 12 using a filler material 24 is meant welding the tube 10 to the member 12 using a filler material 24, brazing the tube 10 to the member 12 using a filler material 24, welding a portion of the tube 10 to a portion of the member 12 using a filler material 24 and brazing another portion of the tube 10 to another portion of the member 12 using the filler material 24, or welding a portion of a filler material 24 to one of the tube 10 and the member 12 and brazing another portion of the filler material 24 to the other of the tube 10 and the member 12. Examples of a "weld/braze zone 30" include a weld zone, a braze zone, and a zone having a weld zone portion and a braze zone portion. Other examples are left to the artisan. A filler material includes a filler weld material and a filler braze material.

Examples of step e) of the first method for welding/brazing a tube 10 to a member 12 using a filler material 24 include non-deformation resistance welding, deformation resistance welding, non-deformation resistance brazing and deformation resistance brazing. In non-deformation resistance welding, at least some of the tube 10 and/or at least some of the member 12 are melted by the internal heat produced during the creation of the resistance current path in step e); In deformation resistance welding, at least some of the tube 10 and/or at least some of the member 12 need only be softened (but may have at least a portion melted) by the internal heat produced during the creation of the resistance current path in step e). In non-deformation resistance brazing or deformation resistance brazing, no portion of the tube 10 and/or no portion of the member 12 is melted. Other examples are left to the artisan.

In one example of the filler material 24, the filler material 24 includes at least one gasket 32, and step d) disposes the at-least-one gasket 32 between the tube form 18 and the member 12. In another example, the filler material includes a coating disposed on the tube form. In one variation, the coating is plated on the tube form. In an additional example, the filler material includes a coating disposed on the member. In a further example, the filler material includes a first coating portion disposed on the tube form and includes a second coating portion disposed on the member.

In one example of the first method, the member 12 is a tubular member as shown in FIGS. 2 and 3. In one modification, the weld zone 30 extends the width of the tube form 18 as can be seen in FIG. 3. In another modification, not shown, the weld zone extends the width of the gasket 32. In one variation, not shown, a portion of the tube above the tube form extends inside the tubular member. In a different example, the member is a non-tubular member. In one variation, the member is a plate (without a hole or with a hole in which the tube is partially disposed). In another variation, the member is a thicker solid. In one choice of materials, the tube 10 and the member 12 consist essentially of steel, and the filler material 24 consists essentially of copper. Other variations, and other choices of materials making up the tube, the member and the filler material, are left to the artisan.

In one construction using the first method, the tube 10 is a substantially circular tube. In one variation, the tube 10 is a completely straight tube. In another variation, the tube is a bent or otherwise non-straight tube. In one modification, the tube is a long tube. In another modification, the tube is a short tubular connector. It is noted that a tube axially extends along its centerline and that the length of a tube is the distance along its centerline whether the centerline is straight or not. Other constructions, variations, and modifications of the tube are left to the artisan.

In one embodiment using the first method, the tube form 18 is disposed proximate an end of the tube 10 as shown in FIG. 2. The term "proximate" includes "at". In a different embodiment, the tube form is disposed elsewhere on the tube than proximate an end of the tube. In one variation of this different embodiment, the first method resistance welds/brazes a tube to a plate wherein the plate has a through hole surrounding the tube and wherein the tube extends both above and below the plate. Other embodiments and variations are left to the artisan.

In one enablement of the first method, the tube form 18 is a fold 34 as shown in FIG. 2. A "fold" is a fold of the tube wall of a portion of the tube. The fold may or may not include axially-spaced-apart first and second fold portions. In one variation, the fold is an annular fold. In one modification, the fold is an outwardly-extending annular fold. In a different enablement, the tube form 18 is a flange. For purposes of describing any of the methods, a flange is a tube form which does not include a fold. In one variation, the flange is an annular flange. In one modification, the flange is an outwardly-extending annular flange. Other annular and non-annular tube forms, including inwardly-extending (or both inwardly and outwardly-extending) tube forms, are left to the artisan.

In one enablement of the first method, the tube form 18 is a monolithic portion of the tube 10. In one technique, conventional tube forming methods are used to create the tube form 18 such as by surrounding the tube 10 with a die having a tube-form-shaped recess, supporting the inside of the tube 10 with a solid cylinder, and pushing against the ends of the tube 10 to force a portion of the tube 10 into the recess to create the tube form 18. In another technique, the tube 10 is created by pouring molten metal into a tube mold which is shaped to create the tube form 18. Other enablements and techniques are left to the artisan.

FIG. 2 shows one electrode choice which can be used in a conventional resistance welding machine to perform the first method (higher electric currents would be used for welding and lower electric currents would be used for brazing the same parts). In this choice, first and second electrodes 36 and 38 are used. The first electrode 36 is an annular (e.g., a one or two or more piece annular) electrode disposed axially against the tube form 18 on a surface of the tube form 18. The second electrode 38 also is an annular electrode disposed as shown in FIG. 2.

In one technique using the first method, step e) is performed without relatively axially moving the tube form 18 deformingly toward the member 12. In another technique, step e) includes relatively axially moving the tube form 18 deformingly toward the member 12 (along lines of movement indicated by arrows 39 in FIG. 2.). It is noted, when the welding/brazing of the first method is welding, that step e) is with or without the application of deforming pressure when the metal of the parts to be welded is melted and step e) is with the application of deforming pressure when the metal of the parts to be welded is only softened. Even when not applying deforming pressure, the tube 10 and the member 12 typically would be moved relatively toward each other to maintain the resistance welding/brazing current path during step e). By "relatively moving" a first piece toward a second piece is meant moving the first piece toward the second piece or moving the second piece toward the first piece or moving both pieces toward each other.

In one option using the first method, the weld/braze zone 30 created by step e) is a leak-tight annular weld/braze zone. In another option, the weld/braze zone 30 is not a leak-tight weld zone. A non-leak-tight weld/braze zone is satisfactory for particular welding/brazing applications as can be appreciated by the artisan.

In one deployment of the first method, the tube 10 has a chemical composition which is different from that of the member 12. In one variation, the compositions are such that the tube and the member could be resistance welded without the filler material, and in another variation, they could not. In a different deployment, the tube 10 has a chemical composition which is identical to that of the member 12.

In one operation involving the first method, the final joint consists of the tube 10 and the member 12 joined together through the filler material 24, wherein the filler material 24 fuses together the tube 10 and the member 12 or wherein the filler material 24 coalesces metallurgically through hot diffusion. In one variation, the filler material 24 has an appropriate chemistry or chemistry gradient to accomplish the welding/brazing of the tube 10 to the member 12 accounting for different mechanical, physical, metallurgical bonding, corrosion, and/or thermal properties of the tube 10 and the member 12, as can be appreciated by those skilled in the art.

Figure 4:
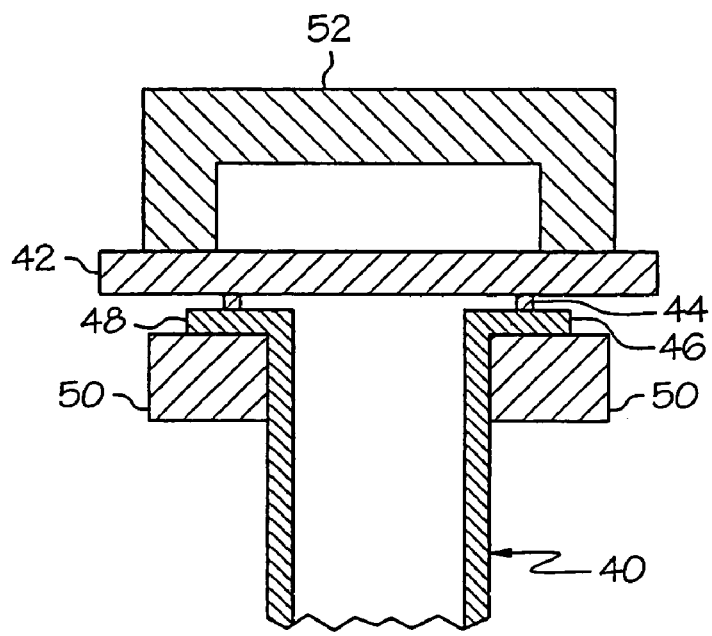
FIG. 4 is a view, as in FIG. 2, but showing a second embodiment of a tube and a member (which is a plate) and a filler material coating used in a second example of the first method, showing the tube and the plate just before welding/brazing.

A second embodiment of a tube 40 and a member 42 (which is a plate) is shown in FIG. 4. In this embodiment, the filler material is a coating 44 on the tube form 46. In this embodiment, the tube form 46 is a flange 48. A first electrode 50 and an annular second electrode 52 are employed as shown in FIG. 4.

In a first application of the first method, step e) specifies that substantially none of the tube 10 and substantially none of the member 12 are autogenously welded together at the tube form. It is noted that autogenous welding means welding together without an intervening filler weld material. A second method of the invention is identical to the first application of the first method except that the tube 10 is welded to the member 12 using a filler weld material creating a weld zone in step e) and except that the filler material 24 is not required to have (but may have) a different chemical composition from that of the tube 10 and/or the member 12. A third method of the invention is identical to the first application of the first method except that the tube 10 is brazed to the member 12 using a filler braze material creating a braze zone in step e).

Several benefits and advantages are derived from one or more of the methods of the invention. The tube form allows resistance welding/brazing of a tube to a member to be commercially feasible, as can be appreciated by those skilled in the art. Resistance welding/brazing is less expensive than gas metal arc welding or friction welding or brazing using an external heat source. Resistance welding/brazing also has a shorter cycle time between welds/brazes than gas metal arc welding or friction welding or brazing using an external heat source. Resistance welding/brazing heats only the joint area of the tube and the member avoiding heat distortion of the parts in contrast to using an external heat source.

The foregoing description of several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

The invention claimed is:

1. A method for welding/brazing a tube to a member comprising the steps of:
   a) obtaining a tube having an axially-extending first portion and having a tube form which extends transversely from the first portion;
   b) obtaining a member;
   c) obtaining a filler material having a different chemical composition from that of the tube and the member;
   d) after steps a) through c), disposing the tube, the member and the filler material such that the filler material contacts the tube form and the member; and
   e) after step d), creating a resistance current path through the tube, the filler material and the member which melts at least some of the filler material creating a weld/braze zone which includes at least some of the tube, at least some of the member, and at least some of the filler material wherein none of the tube and none of the member are autogenously welded together at the tube form.

2. The method of claim 1, wherein the filler material includes a coating disposed on the tube form.

3. The method of claim 2, wherein the coating is plated on the tube form.

4. The method of claim 1, wherein the filler material includes a coating disposed on the member.

5. The method of claim 1, wherein the filler material includes a first coating portion disposed on the tube form and includes a second coating portion disposed on the member.

6. The method of claim 1, wherein the member is a tubular member.

7. The method of claim 1, wherein the member is a non-tubular member.

8. The method of claim 1, wherein the tube form is disposed proximate an end of the tube.

9. The method of claim 1, wherein the tube form is a fold.

10. The method of claim 9, wherein the fold is an outwardly-extending annular fold.

11. The method of claim 1, wherein step e) is performed without relatively axially moving the tube form deformingly toward the member.

12. The method of claim 1, wherein step e) includes relatively axially moving the tube form deformingly toward the member.

13. The method of claim 1, wherein the weld/braze zone created by step e) is a leak-tight annular weld/braze zone.

14. The method of claim 1, wherein the tube has a chemical composition which is different from that of the member.

15. The method of claim 1, wherein the tube has a chemical composition which is identical to that of the member.

16. A method for welding a tube to a member comprising the steps of:
    a) obtaining a tube having an axially-extending first portion and having a tube form which extends transversely from the first portion;
    b) obtaining a member;
    c) obtaining a filler weld material;
    d) after steps a) through c), disposing the tube, the member and the filler weld material such that the filler weld material contacts the tube form and the member; and
    e) after step d), creating a resistance current path through the tube, the filler weld material and the member which melts at least some of the filler weld material creating a weld zone which includes at least some of the tube, at least some of the member, and at least some of the filler weld material wherein none of the tube and none of the member are autogenously welded together at the tube form.

17. A method for brazing a tube to a member comprising the steps of:
    a) obtaining a tube having an axially-extending first portion and having a tube form which extends transversely from the first portion;
    b) obtaining a member;
    c) obtaining a filler braze material having a different chemical composition from that of the tube and the member;
    d) after steps a) through c), disposing the tube, the member and the filler braze material such that the filler braze material contacts the tube form and the member; and
    e) after step d), creating a resistance current path through the tube, the filler braze material and the member which melts at least some of the filler braze material creating a braze zone which includes at least some of the tube, at least some of the member, and at least some of the filler braze material wherein none of the tube and none of the member are autogenously welded together at the tube form.

18. A method for welding/brazing a tube to a member comprising the steps of:
    a) obtaining a tube having an axially-extending first portion and having a tube form which extends transversely from the first portion;
    b) obtaining a member;
    c) obtaining a filler material gasket having a different chemical composition from that of the tube and the member;
    d) after steps a) through c), disposing the tube, the member and the filler material gasket such that the filler material gasket contacts the tube form and the member; and
    e) after step d), creating a resistance current path through the tube, the filler material gasket and the member which melts at least some of the filler material gasket creating a weld/braze zone which includes at least some of the tube, at least some of the member, and at least some of the filler material gasket, wherein none of the tube and none of the member are autogenously welded together at the tube form, and wherein step d) disposes the at-least-one filler material gasket between the tube form and the member.

19. A method for welding/brazing a tube to a member comprising the steps of:
    a) obtaining a tube having an axially-extending first portion and having a tube form which extends transversely from the first portion;
    b) obtaining a member;
    c) obtaining a filler material having a different chemical composition from that of the tube and the member;
    d) after steps a) through c), disposing the tube, the member and the filler material such that the filler material contacts the tube form and the member; and
    e) after step d), creating a resistance current path through the tube, the filler material and the member which melts at least some of the filler material creating a weld/braze zone which includes at least some of the tube, at least some of the member, and at least some of the filler material, wherein the tube form is a flange, and wherein none of the tube and none of the member are autogenously welded together at the tube form.

20. The method of claim 19, wherein the flange is an outwardly-extending annular flange.

* * * * *